United States Patent [19]
Corbett et al.

[11] Patent Number: 4,902,041
[45] Date of Patent: Feb. 20, 1990

[54] BEZEL ASSEMBLY FOR RETRACTOR

[75] Inventors: Thomas J. Corbett, Sterling Heights; Chris C. McGowen, Clarkson; Michael S. Mortier, Rochester Hills; Michele A. Smith, Davisburg, all of Mich.

[73] Assignee: Saturn Corporation, Troy, Mich.

[21] Appl. No.: 316,130

[22] Filed: Feb. 27, 1989

[51] Int. Cl.4 .............................................. B60R 22/34
[52] U.S. Cl. ..................................... 280/807; 242/76
[58] Field of Search ..................... 280/808, 807, 801; 242/76, 107, 107.4 R, 107.4 A–107.4 E; 297/475, 481, 483

[56] References Cited
U.S. PATENT DOCUMENTS

| 4,373,749 | 2/1983 | Miki et al. | 280/807 |
| 4,542,939 | 9/1985 | Geoffrey | 297/481 |
| 4,832,280 | 5/1989 | Haland | 242/76 |

Primary Examiner—David M. Mitchell
Assistant Examiner—Karin Tyson
Attorney, Agent, or Firm—Charles E. Leahy

[57] ABSTRACT

The present invention provides a new and improved bezel assembly for a seat belt retractor and particularly promotes low friction extension and retraction of the belt regardless of variation in the relative locations between the retractor reel and the aperture of the trim panel.

8 Claims, 2 Drawing Sheets

BEZEL ASSEMBLY FOR RETRACTOR

The invention relates to a seat belt retractor in a motor vehicle and more particularly to a bezel assembly which guides the seat belt from the retractor through an aperture in a trim panel covering the retractor.

BACKGROUND OF THE INVENTION

It is well known in motor vehicles to provide a seat belt retractor comprised of a housing having laterally spaced side walls mounting a rotatable reel. A seat belt is attached to the reel and extends about a vehicle occupant. The seat belt retractor is often concealed behind a trim panel of the vehicle body and the belt passes through an aperture in the trim panel. Accordingly, it is known to provide a molded plastic bezel within the aperture of the trim panel. Such a bezel provides an aesthetically pleasing surround for the aperture of the trim panel and also provides a low friction surface for the seat belt to bear against during extension and retraction of the belt by the retractor.

SUMMARY OF THE INVENTION

The present invention provides a new and improved bezel assembly for a seat belt retractor which particularly promotes low friction extension and retraction of the belt regardless of variation in the relative locations between the retractor reel and the aperture of the trim panel.

The belt retractor is mounted on the vehicle body and includes spaced apart side walls and a reel rotatably mounted between the side walls. A belt is attached to the reel for winding and unwinding upon reel rotation and exits from the reel and passes through an aperture of a trim panel which covers the reel. The bezel assembly has a tubular sleeve portion having the belt passing therethrough. The tubular sleeve portion has an outer end extending through the aperture of the trim panel and an inner end which extends beyond the trim panel and into proximity with the reel. The bezel assembly also has a pair of arms which extend from the inner end of the tubular sleeve adjacent the edges of the seat belt and between the ends of the reel and the spaced apart side walls. The arms are pivotally mounted on the side walls to permit pivotal movement of the bezel assembly with respect to the retractor. Variation in the alignment between the retractor and the aperture of the trim panel is accommodated by pivotal movement of the bezel assembly.

The object, feature and advantage of the invention resides in an improved bezel assembly for a seat belt retractor which particularly promotes low friction extension and retraction of the belt regardless of variation in the relative locations between the retractor reel and the aperture of the trim panel.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
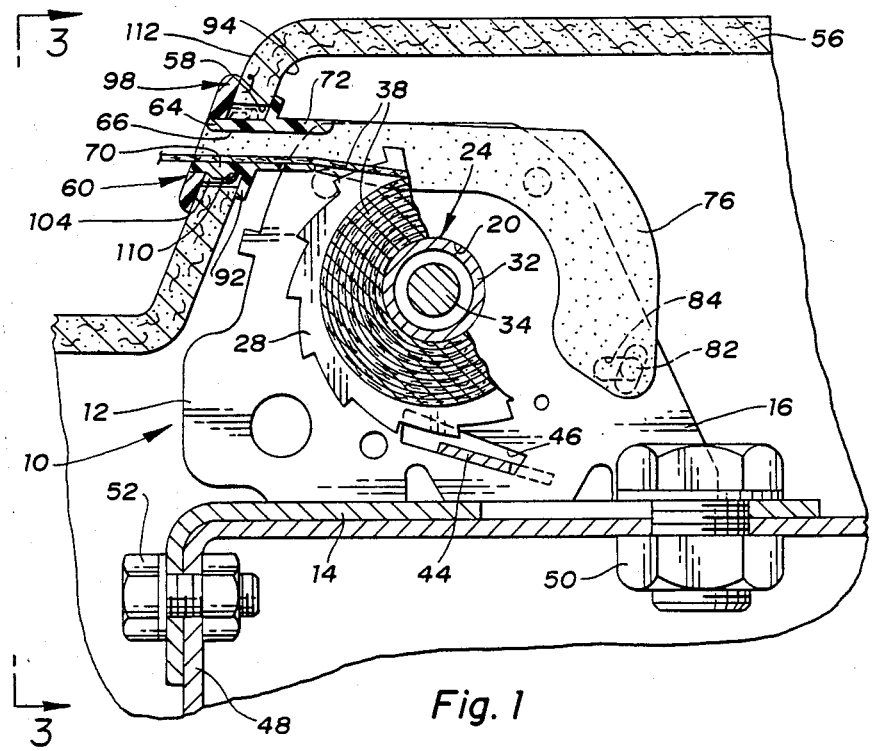
FIG. 1 is a side elevation view of a seat belt retractor and bezel assembly according to the invention.
Figure 3:
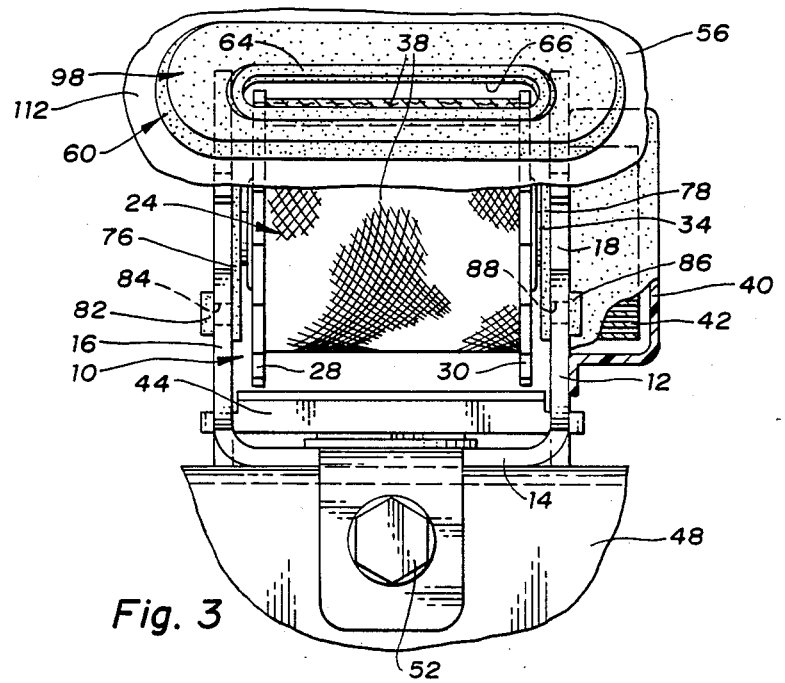
FIG. 3 is a frontal elevation view taken in the direction of arrows 3—3 of FIG. 1.
Figure 4:
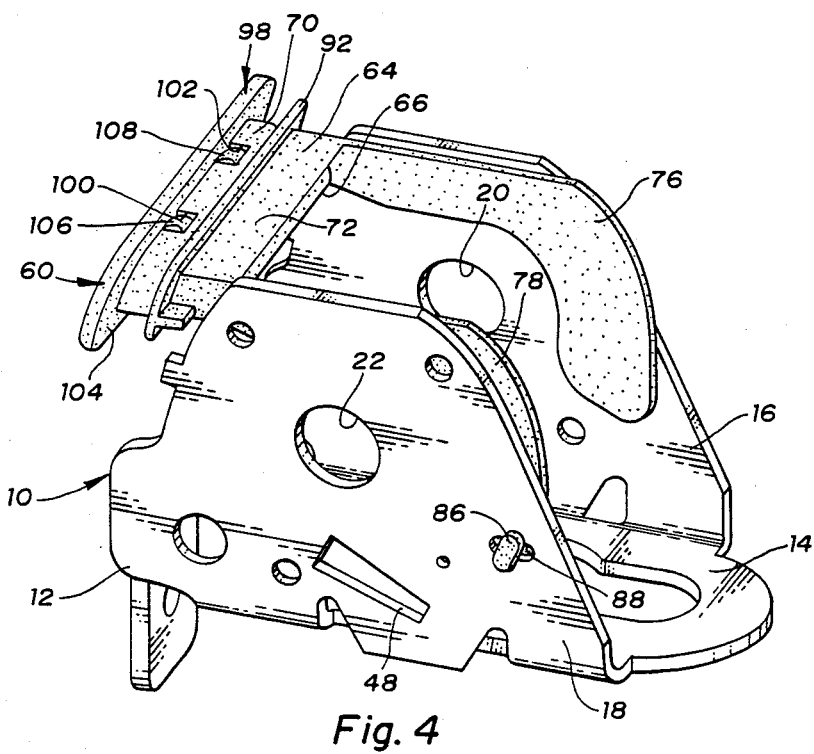
FIG. 4 is a perspective view showing the retractor frame and the bezel assembly.

Referring to FIGS. 1 and 4, it is seen that a seat belt retractor 10 includes a housing 12 having a base wall 14 with upstanding spaced apart side walls 16 and 18. The side walls 16 and 18 respectively have apertures 20 and 22 in which a reel generally indicated at 24 is mounted. As best seen in FIGS. 1 and 3, the reel 24 includes toothed wheels 28 and 30 connected by spool 32 and mounted on the side walls 16 and 18 by reel shaft 34 which seats in the apertures 20 and 22 of side walls 16 and 18. The seat belt 38 is attached to the spool 32 and winds on the spool between the toothed plates 28 and 30. The right hand end of the reel shaft 34, as viewed in FIG. 3, extends into a spring housing 40 and is engaged by a spiral spring 42 which biases the reel 24 in the belt winding direction to retract the belt 38. A lock bar 44 is mounted in openings 46 and 48 of the side walls 16 and 18 for pivotal movement into engagement with the toothed plates 28 and 30 to lock the reel 24 against rotation in the belt unwinding direction.

As best seen in FIG. 1, the retractor 10 is mounted on a vehicle body panel 48 by a nut and bolt assembly 50 and a nut and bolt assembly 52. In FIG. 1, the vehicle body panel 48 is shown as a package shelf behind a rear seat occupant so that the belt 38 extends over the shoulder of the rear seat occupant. A trim panel 56 is mounted on the vehicle body and conceals the retractor 10 from view. The trim panel 56 may be constructed of fiberboard covered with vinyl or fabric, or constructed of molded plastic. In either case, the trim panel 56 has an elongated aperture or slot 58 therethrough which permits the ingress and egress of the belt 38 through the trim panel 56.

A bezel assembly generally indicated at 60 is provided to guide the belt 38 through the trim panel aperture 58. The bezel assembly 60 is preferably of molded plastic and includes a tubular sleeve portion 64 having a belt passage 66 therethrough. As best seen in FIG. 3, the belt passage 66 is somewhat wider than the width of the belt 38 and somewhat taller than the thickness of the belt 38. The tubular sleeve 64 includes an outer end portion 70 which extends through the trim panel aperture 58 and an inner end portion 72 which extends beyond the trim panel 56 and towards the reel 24. The tubular sleeve portion 64 is connected to the retractor frame 12 by a pair of arms 76 and 78 which are molded integrally with the tubular sleeve portion 64 and extend on either side of the belt 38. As best seen in FIGS. 3 and 4, the arm 76 extends between the side wall 16 and toothed plate 28. Likewise, the arm 78 extends between the side wall 18 and the toothed plate 30. Arm 76 carries a headed shank 82 which fits through a slot 84 in the side wall 16. Likewise, the arm 78 carries a headed shank 86 which fits through a slot 88 in the side wall 18. The slots 84 and 88 are elongated in a direction extending generally toward the trim panel aperture 58. The arms 76 and 78 reach around the reel 24 and the slots 84 and 88 are diametrically opposed to the trim panel aperture with respect to the reel 24.

The tubular sleeve portion 64 has an integrally molded flange 92 which seats against the inner surface 94 of the trim panel 56. A trim collar 98, also of molded plastic, fits over the tubular sleeve portion 64 and has receptacles 100 and 102 on the top side thereof, and receptacle 104 on the under side thereof, which receive snap tabs 106, 108 and 110 of the tubular sleeve portion 64 to retain the trim collar 98 in close fitting relationship with the outer surface 112 of the trim panel 56.

Figure 2:
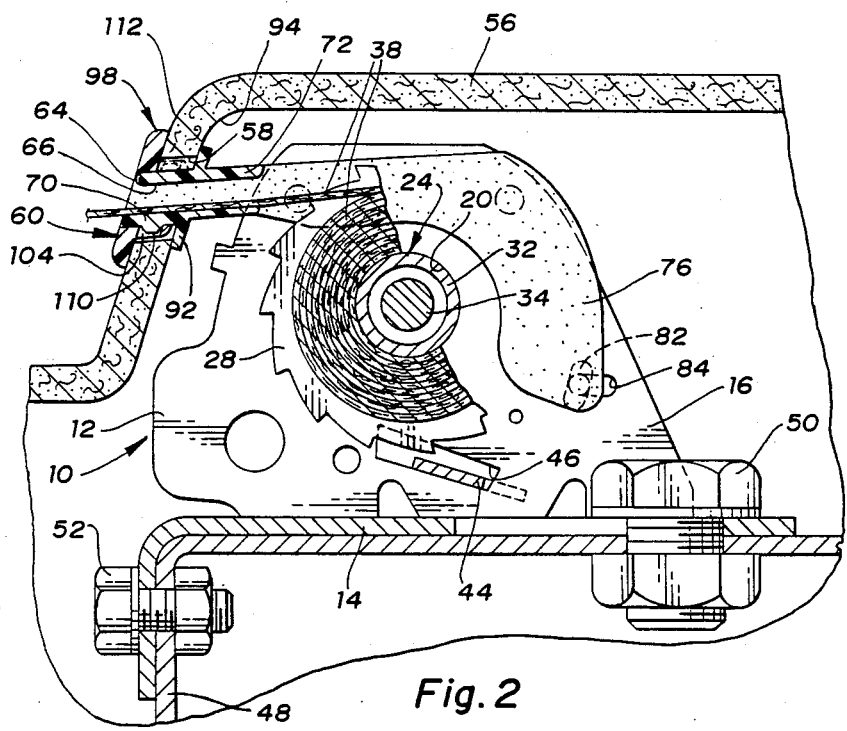
FIG. 2 is similar to FIG. 1 but showing the variation in the mounting of the trim panel so that the bezel assembly has pivoted to accommodate the variation in the trajectory of the belt exiting the reel.

In comparing FIGS. 1 and 2, it is seen that the trim panel 56 is shown in two different mounting positions relative to the retractor 10. These and other mounting variations in the location of the trim panel 56 relative to the retractor 10 may result from variations in manufacturing and assembly processes from one vehicle to another. The bezel assembly of this invention is particularly suited to accommodate such variation in the trim panel 56 and the belt aperture 58 therethrough. In comparing FIGS. 1 and 2, it is seen that the bezel assembly 60 is permitted to pivot about the pivot axis defined by headed shanks 82 and 86 and their respective mounting slots 84 and 88 in the retractor side walls. In addition in comparing FIGS. 1 and 2, it is seen that the bezel assembly 60 is permitted to shift bodily to an extent determined by the length and any orientation of the mounting slots 84 and 88. Accordingly, as seen in comparing FIGS. 1 and 2, the tubular sleeve portion 66 is enabled to move with the trim panel 56 to accommodate the trajectory of the belt 38 as the belt 38 passes to and from the reel 24. The arms 76 and 78 are pivotally adjusted to remain in belt guiding proximity on each side of the edges of the seat belt 38.

Thus it is seen that the invention provides a new and improved bezel assembly for a seat belt retractor which accommodates dimensional variation between the retractor and the belt passage slot of a trim panel concealing the retractor.

The embodiments of the invention in which an exclusive property or privilege is claimed are defined as follows:

1. In a seat belt retractor mounted on a vehicle body behind a vehicle body trim panel and having a belt extending and retracting from a reel and passing through an aperture in the trim panel, the improvement comprising:
   a bezel assembly having a tubular sleeve portion defining a belt passage therethrough, said tubular sleeve portion having an outer end extending through the aperture of the trim panel and an inner end extending beyond the trim panel and into proximity with the reel, and means mounting the inner end of the tubular sleeve on the retractor in a manner permitting movement of the tubular sleeve portion to align with the path of belt between the reel and the aperture of the trim panel.

2. The combination of claim 1 further characterized by the trim panel having an inner surface and an outer surface, a flange integral with the tubular sleeve portion engaging the inner surface of the trim panel and a trim collar adapted for installation onto the tubular sleeve portion to engage with the outer surface of the trim panel.

3. In a seat belt retractor mounted on a vehicle body behind a vehicle body trim panel and having a belt extending and retracting from a reel and passing through an aperture in the trim panel, the improvement comprising:
   a bezel assembly having a tubular sleeve portion defining a belt passage therethrough, said tubular sleeve portion having an outer end extending through the aperture of the trim panel and an inner end extending beyond the trim panel and into proximity with the reel, and a pair of arms extending from the inner end of the tubular sleeve and pivotally mounted on the retractor to permit pivotal movement of the tubular sleeve portion to align with the path of belt between the reel and the aperture of the trim panel.

4. The retractor of claim 3 further characterized by means mounting the pair of arms on the retractor for pivotal and bodily shiftable movement relative to the retractor so that the tubular sleeve portion is permitted to move both pivotally and toward and away from the reel to align with the path of belt between the reel and the aperture of the trim panel and accommodate mounting variation in the position of the trim panel.

5. A seat belt retractor adapted for mounting on a vehicle body behind a trim panel having an aperture permitting belt ingress and egress, comprising:
   a housing having first and second spaced apart walls;
   a reel rotatably mounted on the housing between the walls and having a belt wound thereon and exiting from the reel and through the aperture of the trim panel;
   a bezel assembly having a tubular sleeve defining a belt passage therethrough and extending through the aperture of the trim panel to guide the belt during ingress and egress, first and second arms extending from the tubular sleeve and along the sides of the belt into juxtaposition respectively with the first and second spaced apart side walls, and pivot means mounting each of the arms on the adjacent wall.

6. The retractor of claim 5 further characterized by the first and second arms extending between the reel and the side walls of the housing.

7. The retractor of claim 6 further characterized by the first and second arms extending between the reel and the side walls of the housing to a point beyond the reel and that the pivot means mounting each of the arms on its adjacent wall is located at a point on the housing diametrically opposed to the tubular sleeve of the bezel.

8. A seat belt retractor adapted for mounting on a vehicle body behind a trim panel having an aperture permitting belt ingress and egress, comprising:
   a housing having first and second spaced apart walls;
   a reel rotatably mounted on the housing between the walls and having a belt wound thereon and exiting from the reel and through the aperture of the trim panel;
   a bezel assembly having a tubular sleeve defining a belt passage therethrough and extending through the aperture of the trim panel to guide the belt during ingress and egress, first and second arms extending from the tubular sleeve and along the sides of the belt into juxtaposition respectively with the first and second spaced apart side walls, integral pivot means extending laterally from the first and second arms,
   and elongated slots provided respectively in the first and second housing walls and receiving the integral pivot means to permit pivotal and bodily shiftable movement of the tubular sleeve relative to the reel.

* * * * *